(12) United States Patent
Wickeraad et al.

(10) Patent No.: US 11,316,788 B2
(45) Date of Patent: Apr. 26, 2022

(54) DYNAMIC ALLOCATION OF RESOURCES WITHIN NETWORK DEVICES

(71) Applicant: Hewlett Packard Enterprise Development LP, Houston, TX (US)

(72) Inventors: John A. Wickeraad, Granite Bay, CA (US); Mark Gooch, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/762,734

(22) PCT Filed: Sep. 30, 2015

(86) PCT No.: PCT/US2015/053299
§ 371 (c)(1),
(2) Date: Mar. 23, 2018

(87) PCT Pub. No.: WO2017/058215
PCT Pub. Date: Apr. 6, 2017

(65) Prior Publication Data
US 2018/0295060 A1    Oct. 11, 2018

(51) Int. Cl.
| | |
|---|---|
| H04L 12/743 | (2013.01) |
| H04L 12/911 | (2013.01) |
| H04L 45/745 | (2022.01) |
| H04L 47/70 | (2022.01) |
| H04L 12/851 | (2013.01) |

(Continued)

(52) U.S. Cl.
CPC .......... *H04L 45/7457* (2013.01); *H04L 47/70* (2013.01); *H04L 45/7453* (2013.01); *H04L 47/24* (2013.01)

(58) Field of Classification Search
None
See application file for complete search history.

(56) References Cited

U.S. PATENT DOCUMENTS

| | | |
|---|---|---|
| 5,313,611 A | 5/1994 | Franklin et al. |
| 8,457,131 B2 | 6/2013 | Smith et al. |
| 8,599,049 B2 | 12/2013 | Wang et al. |

(Continued)

OTHER PUBLICATIONS

City University of Hong Kong, Design of a near-minimal dynamic perfect, hash function on embedded device, Jan. 1, 2013, pp. 1-6, Retrieved from the EP Search Report dated Feb. 11, 2019.

(Continued)

*Primary Examiner* — Christopher M Crutchfield
*Assistant Examiner* — Alan L Lindenbaum
(74) *Attorney, Agent, or Firm* — Hewlett Packard Enterprise Patent Department

(57) ABSTRACT

Examples relate to dynamic allocation of resources within network devices. In one example, a computing device may: receive, from a particular lookup function of a plurality of lookup functions, a lookup request for a network packet; identify, based on a logical table that corresponds to the particular lookup function, at least one physical resource included in a particular resource pool of at least one dynamic resource pool; obtain, from a particular physical resource of the at least one physical resource, response data that is responsive to the lookup request; and provide the response data to the particular lookup function.

20 Claims, 4 Drawing Sheets

(51) Int. Cl.
　　　　*H04L 45/7453*　　　(2022.01)
　　　　*H04L 47/24*　　　　(2022.01)

(56) References Cited

U.S. PATENT DOCUMENTS

| | | |
|---|---|---|
| 2009/0276604 A1 | 11/2009 | Baird et al. |
| 2009/0320033 A1 | 12/2009 | Gokhale et al. |
| 2011/0276752 A1 | 11/2011 | Kishore |
| 2011/0307656 A1 | 12/2011 | Hamdi |
| 2014/0025770 A1 | 1/2014 | Warfield et al. |
| 2014/0089498 A1* | 3/2014 | Goldfarb .............. H04L 63/0263 709/224 |
| 2014/0122791 A1* | 5/2014 | Fingerhut ............... H04L 49/00 711/108 |
| 2015/0180801 A1 | 6/2015 | Casado et al. |

OTHER PUBLICATIONS

International Searching Authority, The International Search Report and the Written Opinion, dated Jun. 29, 2016, PCT/US2015/053299, 14 Pgs.

Jason Cong et al., "Energy-Efficient Computing Using Adaptive Table Lookup Based on Nonvolatile Memories," Symposium on Low Power Electronics and Design, Sep. 4-6, 2013, pp. 280-285, IEEE.

\* cited by examiner

DYNAMIC ALLOCATION OF RESOURCES WITHIN NETWORK DEVICES

BACKGROUND

Computer networks often include a variety of different types of devices for handling network traffic. Servers, routers, switches, and load-balancers, for example, are devices that may operate within a computer network to route traffic from one computing device to another. In some situations, network devices may be used to determine the manner in which network traffic is routed, such as the path a network packet takes, the network packet's quality of service (QoS), and/or any access controls associated with the network packet source or destination.

BRIEF DESCRIPTION OF THE DRAWINGS

The following detailed description references the drawings, wherein.

DETAILED DESCRIPTION

Figure 1:
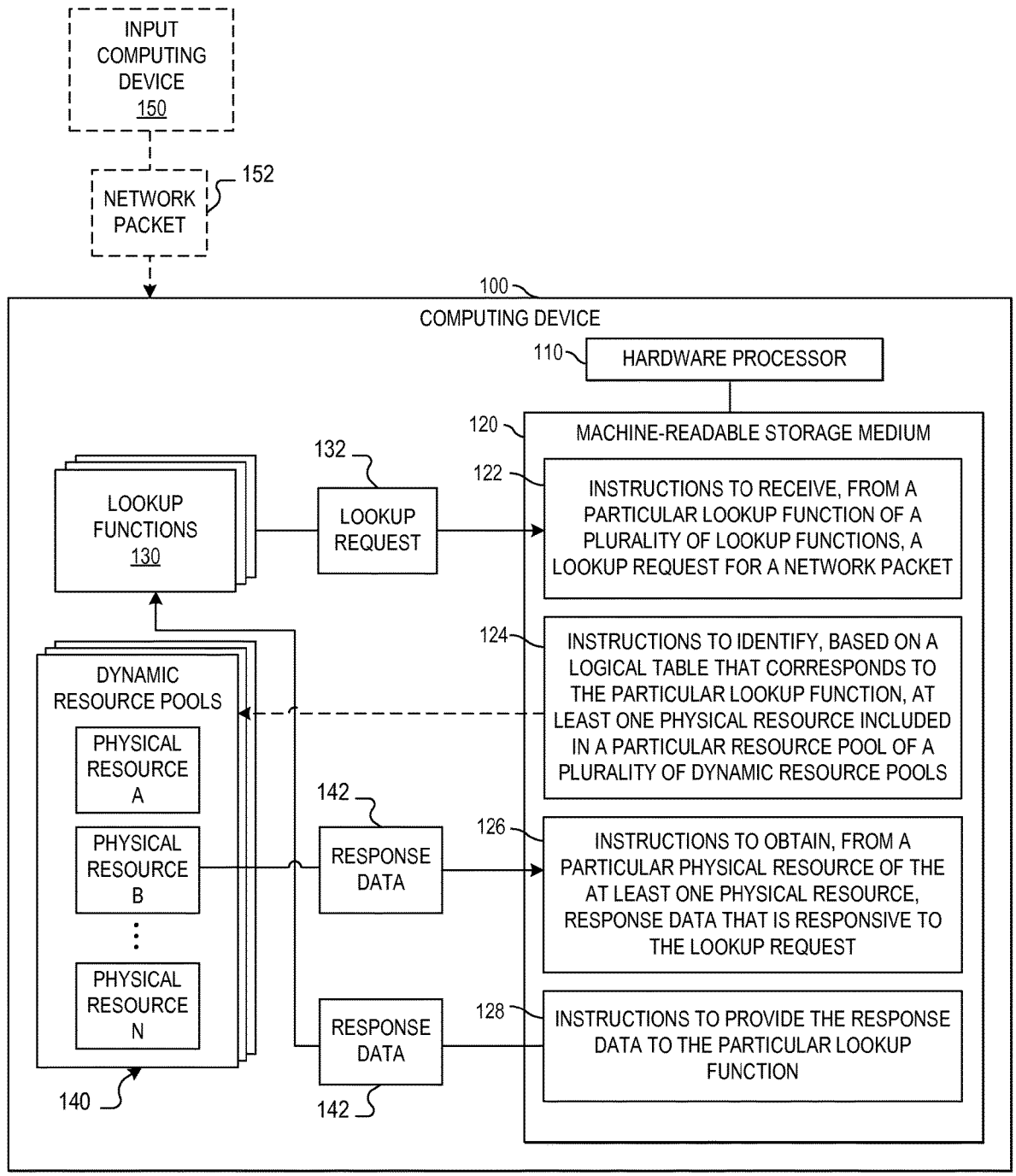
FIG. 1 is a block diagram of an example computing device for using dynamically allocated resources within network devices.

Intermediary network devices, such as switches and routers, may include a variety of lookup functions to determine how to process network packets that are received by the devices. For example, lookup functions may be used, within a switch or router, to implement or facilitate implementation of features such as bridging, routing, Access Control List (ACL) security, Quality of Service (QoS), and OpenFlow functionality. Each lookup function generally makes use of one type of resource within a network device, such as a lookup table, a hash table, or Ternary Content-Addressable Memory (TCAM). The size and number of tables used for each lookup function may vary depending upon on a variety of things, such as the type of device, the network topology, and user preferences. The ability to dynamically allocate the physical resources of a network device to particular lookup functions may facilitate relatively efficient performance of the network device and provide flexibility to the network device, allowing it to be used in a variety of situations and network configurations.

By way of example, a network switch may include three pools of physical resources, e.g., one pool of Random Access Memory (RAM) for lookup tables, one pool of RAM for hash tables, and one pool of TCAM. The individual physical resources within each pool may have a variety of capacities for storing data, e.g., 2K, 4K, 8K, 16K, etc. A set of physical resources within each resource pool may be allocated to each network lookup function implemented in the network switch, and a combination of logical tables and logical-physical resource mappings may be used to allow lookup functions to access their allocated physical resources. The resources are dynamically allocable, such that the resources allocated for a particular lookup function may change, e.g., by adding un-allocated resources, or removing de-allocated resources, to or from the lookup function's corresponding logical table and logical-physical mapping. Accordingly, the network switch may support changes in resource demands of various lookup functions in various situations.

Upon receipt of a network packet, the network switch may run one or more of the lookup functions implemented in the network switch. Each lookup function may produce a lookup request that includes data used to identify to which resource pool the lookup request should be provided. For example, logical tables of the resource pools are used to identify, for each lookup request, which pool of physical resource(s) store data for the lookup function, and a logical-physical mapping included in the pool of physical resources may be used to identify which particular physical resource(s) include data that is responsive to the lookup request. The responsive data may then be obtained and returned to the lookup function that issued the request. The results of the lookup request(s) for a particular network packet may be used to determine the manner in which the network packet is processed by the network switch.

By way of example, a bridging lookup function may issue a lookup request to identify the egress switch port associated with the destination MAC address for a particular network packet received by a network switch. The lookup request may be directed to a resource pool and a set of physical resources within the pool that were dynamically allocated to the bridging lookup function. The egress switch port may be obtained from return data provided by the set of physical resources and provided to the bridging lookup function, which may then use the egress port to forward the particular network packet to the correct egress switch port. The configuration of dynamically allocated network resources, and the usage of network devices that use dynamically allocated network resources, are described in further detail in the paragraphs that follow.

Referring now to the drawings, FIG. 1 is a block diagram of an example computing device 100 for using dynamically allocated network resources. Computing device 100 may be, for example, a network switch, network router, a wireless access point, an intrusion detection/protection device, a load balancer, a firewall, a server computer, a personal computer, or any other electronic device suitable for processing network communications data. In the implementation of FIG. 1, computing device 100 includes hardware processor 110 and machine-readable storage medium 120. In some implementations, the computing device 100 may be implemented in programmable hardware, e.g., using an Application Specific Integrated Circuitry (ASIC).

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-128, to control the process for using dynamically allocated network resources. As an alternative or in addition to retrieving and executing instructions, hardware processor 110 may include one or more electronic circuits, such as an ASIC and/or Field-Programmable Gate Array (FPGA), that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for using dynamically allocated resources.

As shown in FIG. 1, the computing device 100 executes instructions 122 to receive, from a particular lookup function of a plurality of lookup functions 130, a lookup request 132 for a network packet 152. In the example of FIG. 1, the example network packet 152 is shown as being received by the computing device 100 from an input computing device 150. In a situation where the computing device 100 implements a network switch, for example, the input computing device 150 may be the source of the network packet 152 or may be another intermediary computing device that facilitates routing of the network packet 152 to its destination, e.g. a next-hop router, an adjacent switch or a client machine.

Each of the plurality of lookup functions 130 may perform lookups designed to determine how the computing device 100 should process the network packet. For example, a destination MAC address lookup function may be used to determine the egress switch port of the network packet 152. A QoS lookup function may be used to determine the QoS of the network packet 152, which may affect the priority, e.g. queuing, Class of Service (CoS), and/or Differentiated Services Code Point (DSCP) of the network packet 152. An Access Control List (ACL) lookup function may be used to determine whether the network packet 152 is permitted by the security/access controls. A routing lookup function may be used to determine how the network packet 152 will be routed, e.g., which output port of the computing device 100 will be used to send the network packet 152 to its destination.

In some implementations, lookup requests, such as the lookup request 132, may include data used to identify a resource pool to which the lookup requests should be provided. Each of the dynamic resource pools 140 includes physical resources for storing data used by the lookup functions 130. Lookup requests may include an identifier that specifies which resource pool the lookup request should be directed to. In some implementations, lookup requests are provided to a request crossbar that forwards the lookup requests based on the identifier or, in some implementations, based on a mapping of lookup functions to resource pools. Each of the dynamic resource pools may include a different type of physical resources. For example, one dynamic resource pool may include RAM for lookup tables, another dynamic resource pool may include RAM for hash tables, and another dynamic resource pool may use TCAM.

The computing device 100 executes instructions 124 to identify, based on a logical table that corresponds to the particular lookup function, at least one physical resource included in the particular resource pool of the dynamic resource pools 140. For example, the computing device 100 may, based on the logical table for a particular lookup function, identify a resource pool within the dynamic resource pools 140 and at least one physical table within the identified resource pool. The lookup function 130 may then issue a request and an associated logical table number, with the logical table number being mapped to a specific resource pool from the dynamic resource pools 140, e.g., such that the request can be delivered to the correct physical resource(s) using a logical-physical mapping.

The physical resources within each of the dynamic resource pools 140 are dynamically allocable to the lookup functions 130. Each physical resource, e.g., physical resources A, B . . . N, has a corresponding size, or capacity, for storing data for lookup functions. For example, each physical resource may be a block of 2K, 4K, 8K, or 16K. Each physical resource within a resource pool may be of the same size or, in some implementations, different physical resource sizes may be used within the same resource pool. In a situation where a resource pool includes physical resources with a capacity of 4K, and a particular lookup function requires 16K of storage, a logical table and/or logical-physical mapping may specify four of the 4K physical resources as being allocated to the particular lookup function. Other physical resources may be allocated to other lookup functions, and un-allocated resources may, in some implementations, be disabled to reduce power consumption.

In some implementations, when physical resource demands for lookup functions change, the physical resources allocated to the lookup functions may also change. For example, when a lookup function requires additional storage, un-allocated physical resources from the corresponding resource pool may be allocated to the lookup function, and references to the physical resources may be added to the corresponding logical table and a table of logical-physical mappings. In situations where a lookup function is no longer being used, or requires less data, physical resources may be de-allocated for that lookup function, and either deactivated or allocated to a different lookup function. Modifications to lookup tables and allocated resources may, in some implementations, be performed by the hardware processor 110 in response to receiving instructions to do so, e.g., instructions provided by a network administrator or management software executing on the computing device 100.

In the example of FIG. 1, the instructions 124 caused the hardware processor to identify physical resource B, e.g., as the physical resource that includes data relevant to the lookup request 132. The computing device 100 executes instructions 126 to obtain, from the particular physical resource, response data 142 that is responsive to the lookup request 132. In the example situation where the lookup request 132 is for a routing function, the hardware processor 110 may identify physical resource B as a TCAM resource allocated to the corresponding lookup function for IP routing and, based on a longest prefix match, an address and/or output port may be obtained, as the response data 142, from physical resource B.

The computing device 100 executes instructions 128 to provide the response data 142 to the particular lookup function that provided the lookup request 132. The response data 142 may be used to process, for example, where the packet is sent, or whether it is subject to a security policy, depending on the type of lookup function 130, e.g. bridging lookup, routing lookup, ACL lookup. For example, in a situation where lookup function 130 is used to perform IP routing on the network packet 152, the lookup request 132 may include the destination IP address of the network packet 152 as well as a logical table number to send the request to the correct resource pool, e.g. a TCAM pool for implementing a longest prefix match lookup. A logical-physical mapping within the resource pool may be used to identify the appropriate physical resource(s) of the identified resource pool 140, which may then be searched, and the response data 142 containing the result of the routing lookup, e.g. an egress interface to which the packet is to be routed, is sent back to the requesting lookup function 130, e.g., for inclusion in the list of processing/forwarding operations that are to be performed on the network packet 152.

The example functionality described above with respect to FIG. 1 provides one of a variety of example network lookups and dynamic resource configurations. Further implementations and examples are described in further detail in the paragraphs that follow.

Figure 2:
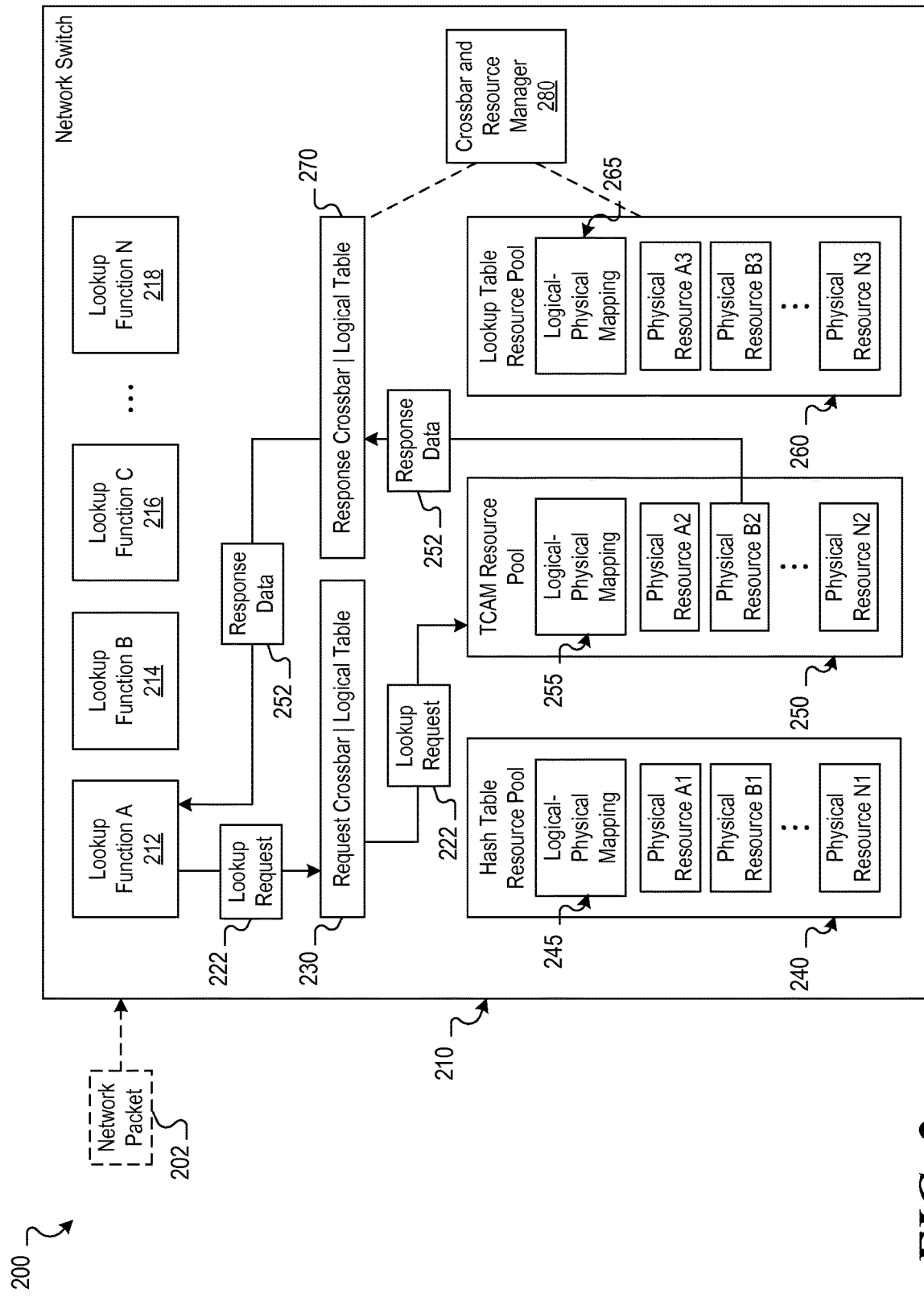
FIG. 2 is an example data flow for dynamic allocation of resources within network devices.

FIG. 2 is an example data flow 200 for dynamic allocation of network resources. The data flow 200 depicts a network switch 210 processing a network packet 202. The network switch 210 may include programmable hardware, such as an ASIC or FPGA, configured to perform operations designed to dynamically allocate network resources within the network switch 210 and to perform operations designed to process the network packet 202 using the dynamically configured network resources. In some implementations, programmable hardware included in the network switch 210 may be configured to perform the operations described with respect to the hardware processor of FIG. 1.

The network switch 210 includes lookup functions, e.g., lookup function A 212, lookup function B 214, lookup function C 216, and lookup function N 218. Each lookup function may be designed to produce lookup requests for particular network packets and, in some implementations, take action or cause the network switch 210 to take action based upon responses to the lookup requests. For example, a lookup function A 212 may issue lookup requests for access control information for network packets received from a particular source or sources. Lookup function B 214 may be designed to issue lookup requests to obtain a QoS for network packets, e.g., to determine a priority associated with the corresponding network packets. Lookup function C 216 may be designed to issue lookup requests for performing layer 2 bridging, e.g. to lookup a destination MAC address and determine an output port of network switch 210 to which the network packet 202 is sent.

The crossbar and resource manager 280 included in the network switch 210 is designed to configure dynamic resource pools, such as resource pools 240, 250, and 260, and, in some implementations, to configure the request crossbar 230 and response crossbar 270. The request crossbar 230 is responsible for directing lookup requests received from lookup functions to the appropriate resource pools, e.g., the resource pools that include the physical resources allocated to the requesting lookup function. This may be performed in a variety of ways. For example, the request crossbar 230 may implement a lookup table mapping lookup functions to resource pools. As another example, the lookup requests may include data, such as a tag or identifier, used by the request crossbar 230 to determine which resource pool the lookup requests should be forwarded to.

The response crossbar 270 is responsible for forwarding response data received from the dynamic resource pools to the requesting lookup function. As with the request crossbar 230, this may be performed in a variety of ways. For example, the response crossbar may use a lookup table mapping resources to lookup functions, and/or a tag or identifier included in the response data. In implementations where the crossbars map lookup functions to resources, the crossbar and resource manager 280 may be designed to update the mappings within the lookup tables as resource allocations among lookup functions change. In some implementations, a tag may be passed with lookup requests and passed back with response data. The tag may specify the originating lookup function, e.g., to facilitate returning the tag to the lookup function that issued the request. In some implementations, the response crossbar 270 is configured to determine a portion of response data to return to a requesting lookup function. For example, response data may include information not relevant to satisfying the lookup request, and the response crossbar 270 may discard the irrelevant data before returning the relevant response data to the requesting lookup function.

The example network switch 210 includes three resource pools: a hash table resource pool 240, a TCAM resource pool 250, and a lookup table resource pool 260. As described above with respect to FIG. 1, each resource pool includes physical resources that are dynamically allocable to lookup functions. While three resource pools are depicted, in some implementations more resource pools may be used and, in some implementations, a single resource pool may be used. The crossbar and resource manager 280 may determine, for each lookup function, the quantity and type of physical resources to be allocated to each lookup function. The determination may be made, for example, by specifications of the lookup functions or by administrator input or by management software executing on the network switch 210.

The crossbar and resource manager 280 selects the number and type of physical resources to be allocated to each lookup function based on the determinations made above. In the example data flow 200, the crossbar and resource manager 280 manages logical tables included in the crossbars, e.g., to map lookup function requests to the appropriate resource pools. The crossbar and resource manager 280 also generates, for each lookup function, logical to physical mappings to specify the particular physical resources allocated to that lookup function. In the example data flow, logical-physical mappings are depicted for each resource pool, e.g., logical-physical mappings 245, 255, and 265.

In some implementations, a logical-physical mapping table for each resource pool may include mappings of multiple lookup functions to their corresponding allocated physical resources within the pool. In some implementations, each lookup function has their own logical-physical mapping table that specifies the physical resources allocated to the lookup function. By way of example, logical-physical mapping 255 may specify that physical resource B2 is allocated for lookup function A 212. Each logical-physical mapping may be modified, e.g., upon receiving an indication that resource needs for a lookup function have changed. For example, if the network switch 210 is re-deployed in a different network environment, the lookup functions used and the amount of resources needed by the lookup functions may change, and the crossbar and resource manager 280 may update tables that include the logical-physical mappings accordingly, e.g., to allocate and/or de-allocate physical resources within the pools, as appropriate.

The data flow 200 also depicts operation of the network switch 210, including the use of the dynamically allocated network resources. Upon receipt of the network packet 202, lookup function A 212 issues a lookup request 222, which is provided to the request crossbar 230. The request crossbar 230 identifies, e.g., based on a logical table that maps lookup functions to resource pools, the TCAM resource pool 250 as the resource pool having the physical resources allocated for lookup function A 212.

The lookup request 222 is forwarded by the request crossbar 230 to the TCAM resource pool 250. Using the logical-physical mapping 255, physical resource B2 is identified as being allocated to lookup function A 212. In some implementations, multiple physical resources may be identified as being allocated to a particular lookup function. The lookup request 222 is processed and response data 252 that was included in physical resource B2 is identified as being responsive to the lookup request 222. The response data 252 is forwarded to the response crossbar 270, which identifies, e.g., based on a tag included in the response data 252, that the response data 252 should be provided to lookup function A 212. After the response data 252 is provided to lookup function A 212, the lookup function may, for example, use the response data to determine how to process the network packet 202.

In situations where hash tables are handling lookup requests, a hash calculation may be performed by programmable logic, e.g., included in the hash table logic or performed between the request crossbar and the hash table. In some implementations, when using hash table resources, the response data may include an indication of a match or no match, e.g., rather than including the data stored within the corresponding physical resource. In some implementations, additional flexibility may be provided for resource pools with the same underlying resources. For example, lookup tables and hash tables both make use of RAM, and RAM included in a lookup table resource pool may be used by lookup functions that make use of hash tables, while RAM included in a hash table resource pool may be used by lookup functions that make use of lookup tables. In some implementations, the hash tables can be configured to be treated as lookup tables by bypassing a hash calculation operation. For example, the logical table of a lookup function that uses lookup tables may actually specify the hash table resource pool as including the physical resources for that lookup function, and lookup requests may be configured to bypass the hash calculation performed prior to obtaining the data stored in the underlying RAM.

In some implementations, a lookup function may be capable of using different types of resources. For example, some lookup functions may be able to use either a TCAM or a hash table. In this situation, a resource pool for the lookup function may be selected, for example, based on user or lookup function preferences, availability, or preferences of the crossbar and resource manager 280.

While the examples above describe dynamically allocable lookup tables, hash tables, and TCAM, other types of resources within network devices may be dynamically allocated in a similar manner. For example, counter resources, e.g., RAM used to store the number and/or size of network packets processed by a network device, may also be dynamically allocable. In some implementations, counter updates may be provided, e.g., by a counter update request, to the request crossbar, which may include a logical table mapping the counter function to a dynamic physical resource pool for counter values. A counter update request may include, for example, the counter to update, or the value to update it by, e.g., an increment or a value to add to the counter—depending on if the counter is counting packets or number of bytes. Metering resources are another example type of resources which may be dynamically allocated, e.g., resources used for determining load or available bandwidth of the network device. In some implementations, metering values may be provided, e.g., by a metering function implemented in programmable hardware, to either the request crossbar or, in some implementations, directly to a metering resource pool. Metering values may be requested, e.g., by a metering function, in a manner similar to that described above for lookup functions.

In some implementations, network devices that implement dynamically allocated network resources may default to an initial state, e.g., by enabling a minimum amount of resources within each resource pool. This allows the device to allocate additional resources as needed, e.g., as specified by configuration information provided to the programmable hardware implementing the features described above.

While the example data flow 200 depicts programmable hardware performing the functions described above within a programmable network switch, other implementations may also make use of dynamically allocated network resources. For example, routers, wireless access points, intrusion detection and/or protection devices, load balancers, firewalls, server computers, and virtual switches and routers, may all implement the processes for dynamic allocation of resources and/or the use of those dynamically allocated resources.

Figure 3:
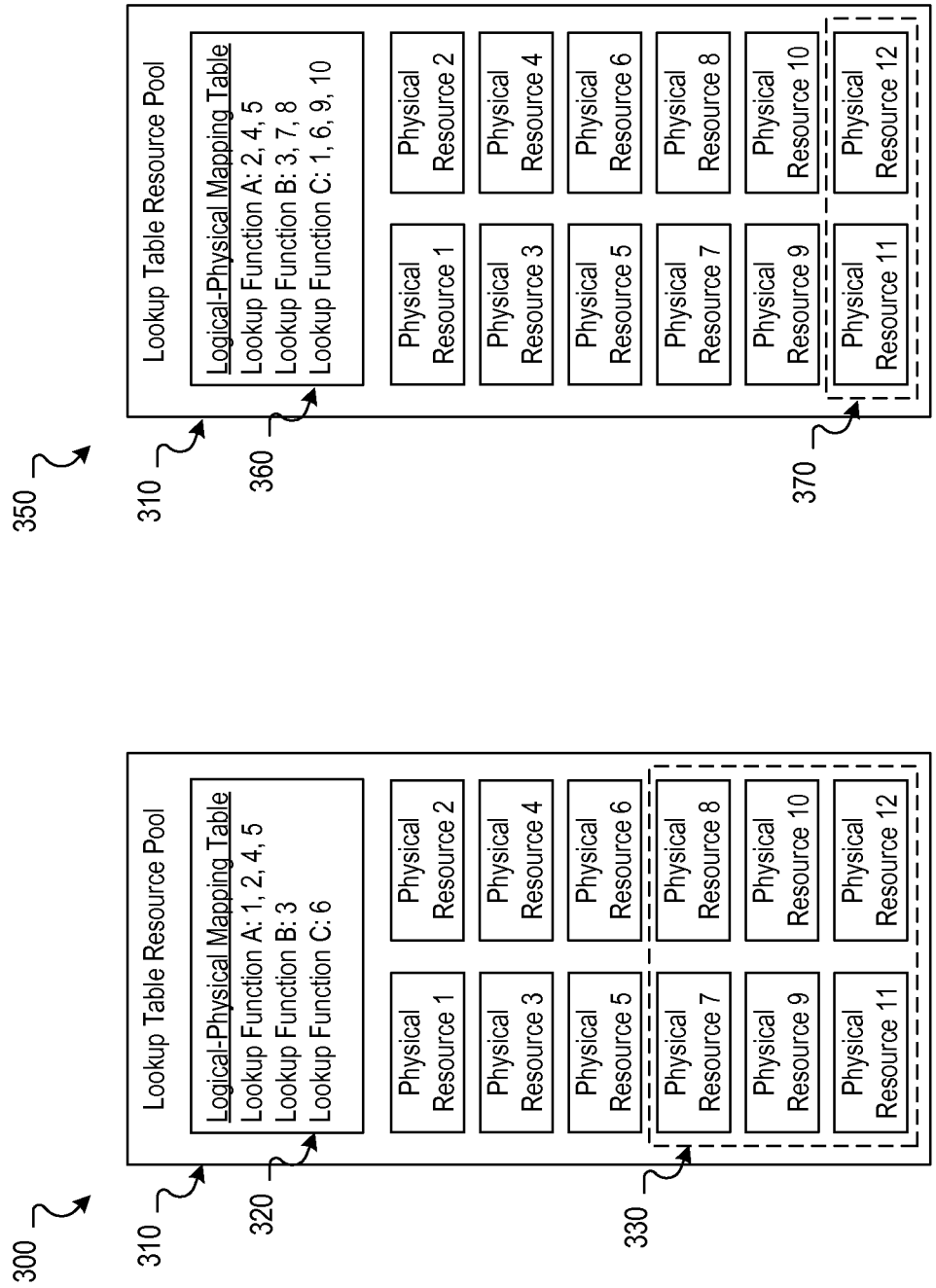
FIG. 3A is an illustration of one example dynamic network resource configuration.
FIG. 3B is an illustration of another example dynamic network resource configuration.

FIG. 3A is an illustration of one example dynamic network resource configuration 300, e.g., for a lookup table resource pool 310 at a particular point in time. The lookup table resource pool 310 includes a logical-physical mapping table 320 that specifies, for each of three lookup functions, the physical resources allocated to the lookup functions. The logical-physical mapping table 320 specifies, for example, that physical resources 1, 2, 4, and 5 are allocated for lookup function A, physical resource 3 is allocated for lookup function B, and physical resource 6 is allocated for lookup function C. The example illustration also depicts inactive resources 330, e.g., resources that are not allocated and which can be disabled to reduce power consumption.

FIG. 3B is an illustration of another example dynamic network resource configuration 350, e.g., for the lookup table resource pool 310 at a different point in time. The lookup table resource pool 310 includes a modified logical-physical mapping table 360 that specifies the physical resources allocated to the same three lookup functions at a different point in time. The example logical-physical mapping table 360, depicts a change to physical resource 1, in that the resource is allocated to lookup function C instead of lookup function A. Physical resources 9 and 10 were also enabled and allocated to lookup function C. These changes indicate that resource demands for lookup function A may have decreased, while resource demands for lookup function C may have increased. In addition, physical resources 7 and 8 have been enabled and allocated to lookup function B. The remaining resources 370 remain disabled, e.g., to reduce power consumption. The resource allocation modifications may be made by programmable hardware implementing, for example, the crossbar and resource manager described with respect to FIG. 2. The modifications may be specified, in some implementations, by the lookup functions, user input, or by a third party device providing instructions to the crossbar and resource manager, e.g., as in a situation with a network controller issuing updates to a network switch that implements the dynamic resource allocation functionality described above.

Figure 4:
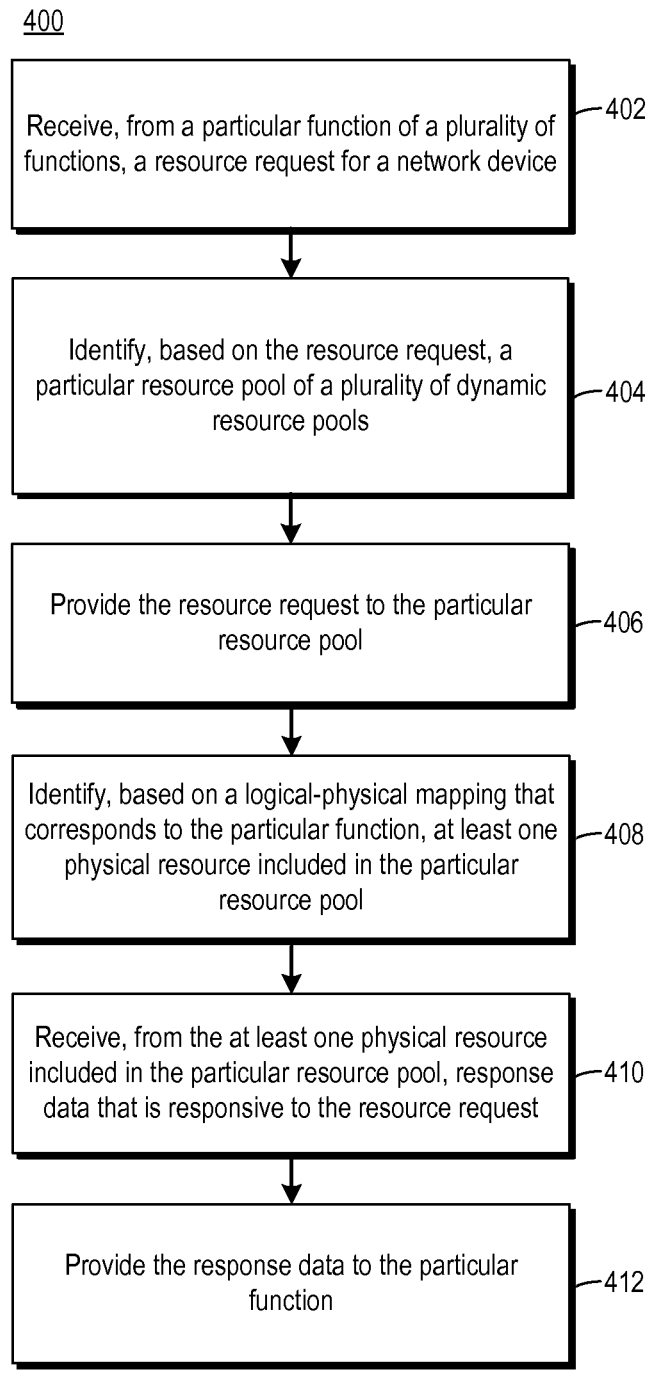
FIG. 4 is a flowchart of an example method for using dynamically allocated resources within network devices.

FIG. 4 is a flowchart of an example method 400 for using dynamically allocated resources within network devices. The method 400 may be performed by a computing device, such as a computing device described in FIG. 1. Other computing devices may also be used to execute method 400. Method 400 may be implemented in the form of executable instructions stored on a machine-readable storage medium, such as the storage medium 120, and/or in the form of electronic circuitry, such as an ASIC.

A resource request for a network device is received from a particular function of a plurality of lookup functions (402). For example, a bridging lookup function may issue a lookup request to identify the egress switch port associated with the destination MAC address for a particular network packet received by a network switch.

Based on the resource request, a particular resource pool of multiple dynamic resource pools may be identified (404).

For example, the lookup request may include an identifier that specifies the lookup request should be sent to a pool of hash table resources to find the destination MAC address. Within a network switch, a request crossbar may perform the identification. In some implementations, the particular resource pool is identified using a logical table that maps the particular function to the particular resource pool.

The resource request is provided to the particular resource pool (406). In the example above, the request crossbar may provide the lookup request to the pool of hash table resources. In some implementations, only one resource pool may be used. In some implementations, multiple resource pools may be used. For example, the dynamic resource pools may include a first pool of physical resources for lookup tables, a second pool of physical resources for hash tables, a third pool of physical resources for ternary content-addressable memory (TCAM), a fourth pool of physical resources for counter storage, and/or a fifth pool of physical resources for metering storage.

Based on a logical-physical mapping that corresponds to the particular function, at least one physical resource included in the particular resource pool is identified (408). The logical-physical mapping may be dynamically configurable, e.g., such that it may be modified over time depending upon the needs of the corresponding function. The logical-table mapping for the destination MAC address lookup function may specify, for example, which physical resources included in the hash table resource pool are allocated for use by the bridging function.

From the physical resource included in the particular resource pool, response data that is responsive to the resource request is received (410). For example, the physical resources allocated to the destination MAC address lookup function may be accessed to obtain the egress switch port that is responsive to the lookup request provided by the destination MAC address lookup function. The response data may be received from the hash table resource pool by a response crossbar.

The response data is provided to the particular function (412). For example, the response data may include data that identifies the lookup function that corresponds to the response data, and a response crossbar may use the data to determine that the response data should be forwarded to the destination MAC address lookup function. The lookup function may perform a variety of actions upon receipt of the response data. For example, the destination MAC address lookup function may use the response data to determine an egress switch port for the received network packet.

In some implementations, the method 400 may include receiving instructions to modify the logical table for one or more functions. The logical table may be modified, for example, by specifying, in the logical table, at least one additional physical resource as being allocated to the particular function; or specifying, in the logical table, at least one physical resource as being de-allocated from the particular function. In some implementations, the method may also include modifying the logical-physical mapping of the particular function. The modification may be done by allocating at least one additional physical resource to the logical-physical mapping or by de-allocating at least one physical resource using the logical-physical mapping. The modifications may be made, for example, by a programmable processor modifying the physical resources specified within the logical tables and/or logical-physical mapping tables for various lookup functions.

The foregoing disclosure describes a number of example implementations for dynamic allocation of resources within network devices. As detailed above, examples provide a mechanism for dynamically allocating physical resources within a resource pool to one or more functions, and potential applications of a system that is capable of dynamically allocating resources in such a manner.

We claim:

1. A computing device for dynamic allocation of network resources, the computing device comprising a programmable hardware processor configured to:
   configure physical resources on a network device into a plurality of resource pools that comprise at least a non-hash lookup table resource pool, a hash table resource pool, and a ternary content-addressable memory (TCAM) resource pool, wherein physical resources within each resource pool are dynamically allocated to one or more lookup functions that perform lookups to process network packets;
   determine, for each of a plurality of lookup functions, a quantity of physical resources for the lookup function and a type of physical resources for the lookup function;
   configure a first mapping table that maps the plurality of lookup functions to the plurality of resource pools based on the determined type of physical resources corresponding to each lookup function wherein configuring the first mapping table comprises mapping a second particular lookup function using non-hash lookup tables to perform lookup to the hash table resource pool; and
   for each of the plurality of resource pools, configure a second mapping table that comprises a mapping between lookup functions and physical resources within the resource pool, wherein an entry in the second mapping table specifies a particular set of physical resources within the resource pool allocated to a particular lookup function, wherein the particular set of physical resources comprise the determined quantity and type of physical resources corresponding to the particular lookup function and wherein configuring the second mapping table comprises mapping a set of hash tables in the hash table resource pool to the second particular lookup function using non-hash lookup tables to perform lookup and
   generate data indicating that lookup requests provided by the second particular lookup function using non-hash lookup tables to perform lookup are to bypass hash calculations.

2. The computing device of claim 1, wherein the hardware processor is further configured to:
   receive, from a third particular lookup function of the plurality of lookup functions, a lookup request for a network packet;
   determine, based on the lookup request and the first mapping table, a particular resource pool from the plurality of resource pools;
   determine, based on the second mapping table that corresponds to the particular resource pool, at least one physical resource included in the identified particular resource pool;
   request, from the at least one physical resource, response data that is responsive to the lookup request;
   receive, from the at least one physical resource, the response data; and
   provide the response data to the third particular lookup function.

3. The computing device of claim 2, wherein the lookup request comprises an identifier, and wherein the particular resource pool corresponding to the particular lookup function is determined based on the identifier.

4. The computing device of claim 1, wherein the hardware processor is further configured to:
receive an indication that additional physical resources are to be allocated for a second particular lookup function; and
responsive to receipt of the indication, modify the second mapping table to specify additional physical resources allocated to the second particular lookup function.

5. The computing device of claim 1, wherein the hardware processor is further configured to:
configure a request crossbar to, for each of the plurality of lookup functions, forward lookup function requests from the lookup function to the corresponding resource pool based on the first mapping table; and
configure a response crossbar to, for each of the plurality of lookup functions, provide response data to the lookup function from a corresponding resource pool.

6. The computing device of claim 1, wherein the plurality of resource pools further includes a counter storage resource pool.

7. The computing device of claim 1, wherein the plurality of resource pools further includes a metering storage resource pool.

8. A non-transitory machine-readable storage medium encoded with instructions executable by a hardware processor of a computing device, the machine-readable storage medium comprising instructions to cause the hardware processor to:
configure physical resources on a network device into a plurality of resource pools that comprise at least a non-hash lookup table resource pool, a hash table resource pool, and a ternary content-addressable memory (TCAM) resource pool, wherein physical resources within each resource pool are dynamically allocated to one or more lookup functions that perform lookups to process network packets;
determine, for each of a plurality of lookup functions, a quantity of physical resources for the lookup function and a type of physical resources for the lookup function;
configure a first mapping table that maps the plurality of lookup functions to the plurality of resource pools based on the determined type of physical resources corresponding to each lookup function wherein configuring the first mapping table comprises mapping a second particular lookup function using non-hash lookup tables to perform lookup to the hash table resource pool; and
for each of the plurality of resource pools, configure a second mapping table that comprises a mapping between lookup functions and physical resources within the resource pool, wherein an entry in the second mapping table specifies a particular set of physical resources within the resource pool allocated to a particular lookup function, wherein the particular set of physical resources comprise the determined quantity and type of physical resources corresponding to the particular lookup function and wherein configuring the second mapping table comprises mapping a set of hash tables in the hash table resource pool to the second particular lookup function using non-hash lookup tables to perform lookup and generate data indicating that lookup requests provided by the second particular lookup function using non-hash lookup tables to perform lookup are to bypass hash calculations.

9. The storage medium of claim 8, wherein the operations further cause the hardware processor to:
receive, from a third particular lookup function of the plurality of lookup functions, a lookup request for a network packet;
determine, based on the lookup request and the first mapping table, a particular resource pool from the plurality of resource pools;
determine, based on the second mapping table that corresponds to the particular resource pool, at least one physical resource included in the identified particular resource pool;
request, from the at least one physical resource, response data that is responsive to the lookup request;
receive, from the at least one physical resource, the response data; and
provide the response data to the third particular lookup function.

10. The storage medium of claim 9, wherein the lookup request comprises an identifier, and wherein the particular resource pool corresponding to the particular lookup function is determined based on the identifier.

11. The storage medium of claim 8, wherein the operations further cause the hardware processor to:
receive an indication that additional physical resources are to be allocated for a second particular lookup function; and
responsive to receipt of the indication, modify the second mapping table to specify additional physical resources allocated to the second particular lookup function.

12. The storage medium of claim 8, wherein the operations further cause the hardware processor to:
configure a request crossbar to, for each of the plurality of lookup functions, forward lookup function requests from the lookup function to the corresponding resource pool based on the first mapping table; and
configure a response crossbar to, for each of the plurality of lookup functions, provide response data to the lookup function from a corresponding resource pool.

13. The storage medium of claim 8, wherein the plurality of resource pools further includes at least one of:
a counter storage resource pool; and
a metering storage resource pool.

14. A method comprising:
configuring physical resources on a network device into a plurality of resource pools that comprise at least a non-hash lookup table resource pool, a hash table resource pool, and a ternary content-addressable memory (TCAM) resource pool, wherein physical resources within each resource pool are dynamically allocated to one or more lookup functions that perform lookups to process network packets;
determining, for each of a plurality of lookup functions, a quantity of physical resources for the lookup function and a type of physical resources for the lookup function;
configuring a first mapping table that maps the plurality of lookup functions to the plurality of resource pools based on the determined type of physical resources corresponding to each lookup function wherein configuring the first mapping table comprises mapping a second particular lookup function using non-hash lookup tables to perform lookup to the hash table resource pool; and for each of the plurality of resource pools, configuring a second mapping table that comprises a mapping between lookup functions and physical resources within the resource pool, wherein an entry in the second mapping table specifies a particular set of physical resources within the resource pool allocated to a particular lookup function, wherein the particular set of physical resources comprise the determined quantity and type of physical resources corresponding to the particular lookup function and wherein configuring the second mapping table comprises mapping a set of hash tables in the hash table resource pool to the second particular lookup function using non-hash lookup tables to perform lookup and generating data indicating that lookup requests provided by the second particular lookup function using non-hash lookup tables to perform lookup are to bypass hash calculations.

15. The method of claim 14, comprising:

receiving, from a third particular lookup function of the plurality of lookup functions, a lookup request for a network packet;

determining, based on the lookup request and the first mapping table, a particular resource pool from the plurality of resource pools;

determining, based on the second mapping table that corresponds to the particular resource pool, at least one physical resource included in the identified particular resource pool;

requesting, from the at least one physical resource, response data that is responsive to the lookup request;

receiving, from the at least one physical resource, the response data; and providing the response data to the third particular lookup function.

16. The method of claim 15, wherein the lookup request comprises an identifier, and wherein the particular resource pool corresponding to the particular lookup function is determined based on the identifier.

17. The method of claim 14, comprising:

receiving an indication that additional physical resources are to be allocated for a second particular lookup function; and responsive to receipt of the indication, modifying the second mapping table to specify additional physical resources allocated to the second particular lookup function.

18. The method of claim 14, comprising:

configuring a request crossbar to, for each of the plurality of lookup functions, forward lookup function requests from the lookup function to the corresponding resource pool based on the first mapping table; and configuring a response crossbar to, for each of the plurality of lookup functions, provide response data to the lookup function from a corresponding resource pool.

19. The method of claim 14, wherein the plurality of resource pools further includes a counter storage resource pool.

20. The method of claim 14, wherein the plurality of resource pools further includes a metering storage resource pool.

* * * * *